Sept. 3, 1963
H. W. GALLAGHER
3,102,473
OPTICAL CONTROL DEVICE
Filed Nov. 8, 1960
2 Sheets-Sheet 1
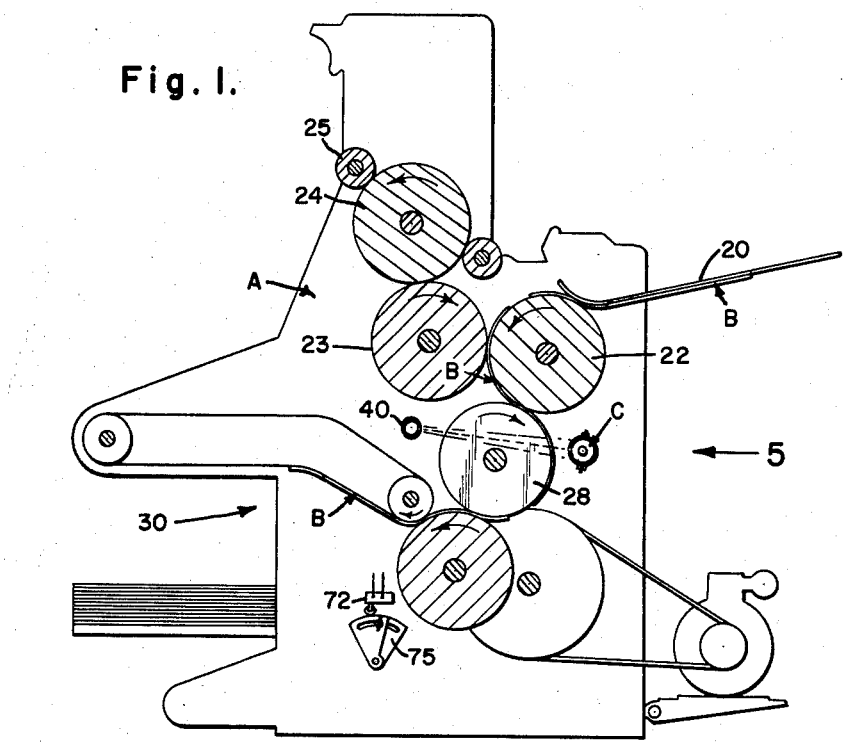
Fig. 1.
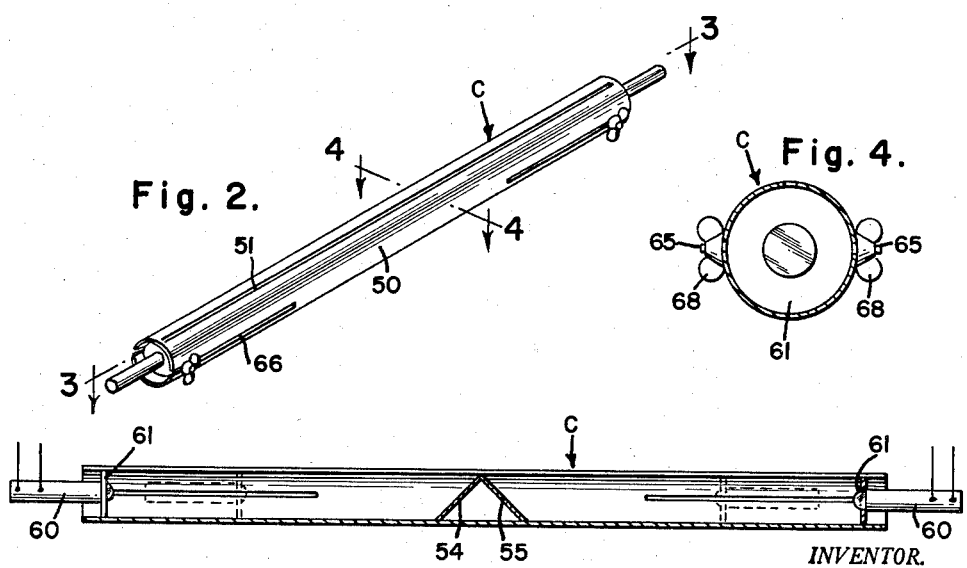
Fig. 2.
Fig. 3.
Fig. 4.
INVENTOR.
Harry W. Gallagher
BY
Townsend and Townsend
attorneys Sept. 3, 1963        H. W. GALLAGHER         3,102,473
                    OPTICAL CONTROL DEVICE
Filed Nov. 8, 1960                        2 Sheets-Sheet 2

INVENTOR.
Harry W. Gallagher
BY
Townsend and Townsend
attorneys

United States Patent Office 3,102,473
Patented Sept. 3, 1963

3,102,473
OPTICAL CONTROL DEVICE
Harry W. Gallagher, 2484 Great Highway,
San Francisco, Calif.
Filed Nov. 8, 1960, Ser. No. 68,015
4 Claims. (Cl. 101—233)

This invention relates to an optical sensing device which will sense light deviations that occur anywhere along a predetermined line.

In many machines it is desirable to sense the presence or absence of an elongated object passing through the machine. This can be done optically by shining a light on a photoelectric cell and passing the object between the photoelectric cell and the light source. The voltage output of the photoelectric cell is thus indicative of the object passing the cell. The information can be used to control, stop or otherwise regulate the machine. In many machines, however, such as a printing press, the problem of adequately sensing the presence of the paper at a particular position in the machine is more difficult due to the fact that it is desirable not only to sense the presence of paper per se but to sense whether the paper is a complete untorn sheet. The problem becomes more difficult to solve when the paper is substantially wide, say for example in the order of 36 inches or more. In such cases it is necessary to sense the light transmission throughout the entire length of a piece of paper so that in the event a portion of the paper is torn the output of the photoelectric cell will vary to an extent to tell the machine that there is a malfunction. In printing presses the presence of a tear indicates that a portion of the paper still remains on one of the platens, transfer rollers or other portion of the equipment. The presence of even minor pieces of paper on the equipment can cause a complete jamming of the machine, imperfect reproduction of the subsequent prints or actual damage in the expensive mechanism of the machine.

The principal object of this invention is to provide a novel light receiving tube which can receive light throughout a substantially long line in such a way that all areas along the line are optically sensed by a light sensing device or transducer.

A feature and advantage of this invention is that when the light sensing tube is employed with an industrial machine, such as a printing press, the tube is capable of sensing a tear occurring anywhere along the scan line of the tube.

Another feature and advantage of this invention is that one or two photoelectric sensing elements can be utilized as the sole electrical optical transducers for sensing light throughout a substantially long area thus eliminating the need for multiple transducers.

Another object of this invention is to provide a novel light sensing tube having two photoelectric cells mounted on opposite ends of the interior of the tubes and in which the tube is formed with a longitudinal light receiving aperture so that the photoelectric cells are sensitive to deviation of light passing through any portion of the aperture.

A further object of this invention is to provide means for limiting the scan area of the tube by moving the photoelectric cells inwardly to the selected scan length.

A still further object of this invention is to provide a light collecting tube having a highly reflective surface in the interior of the tube, a mirror at one end of the tube and a photoelectric cell in the opposite end of the tube in which the light is collected in the tube through an elongated slit so that the tube scans the area equal to the spacing between the mirror and the photoelectric cell.

Other objects of the present invention will become apparent upon reading the following specification and referring to the accompanying drawings in which similar characters of reference represent corresponding parts in each of the several views.

In the drawings:

FIG. 1 is a schematic view of a typical printing press with the principal embodiment of the invention attached thereto.

FIG. 2 is a perspective view showing the entire sensing tube.

FIG. 3 is a sectional view of the tube of FIG. 2.

FIG. 4 is a cross-sectional view of the tube of FIG. 2.

Figure 5:
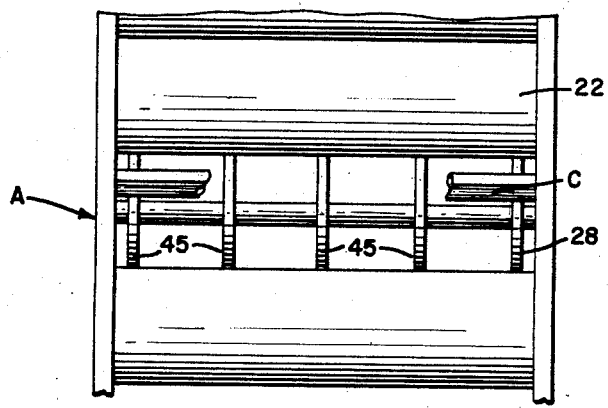
FIG. 5 is a fragmentary view showing the light sensing device mounted on the printing press of the type as shown in FIG. 1.

In FIGS. 1 and 5 a conventional printing press is schematically depicted to illustrate how the sensing device of this invention can be employed with a practical machine.

The illustrative press of FIG. 1 is generally indicated at A. Sheets of paper B are fed into press A on a feed belt 20 to an impression drum 22.

The printing occurs by virtue of a blanket drum 23 which has ink impressed upon it from a plate drum 24. The plate drum is supplied with ink from an inking roller 25. The paper then proceeds to a transfer drum 28 which is particularly shown in FIG. 5. The paper then proceeds to the discharge station generally indicated at 30 for deposit.

In normal operation the paper freely flows from feed belt 20 around impression drum 22 where the printing is effected. The paper then proceeds downwardly over the transfer drum and then to discharge station 30. Occasionally the paper will stick in its transfer to blanket drum 23. This can cause the complete malfunction of the machine or even damage to the machine if the press is run for any substantial period of time with the paper wrapped around the blanket drum. Occasionally the paper is torn as it goes through the printing station and particles of the paper may be dislodged in some other part of the printing mechanism. The small pieces of paper in the printing press may actually cause damage to the machine or may interfere with the proper reproduction of printed material that is subsequently processed by the machine.

It is therefore important to know that a complete full sheet of paper is passed over the transfer drum and to stop the machine in the event that either a torn sheet or no sheet at all passes the transfer drum at each designated time interval.

The subject invention is arranged to sense the presence of a complete piece of paper during the designated time interval and to turn off the machine should there be an absence of paper or a torn paper at the designated time interval.

To sense this condition a photoelectric sensing device generally indicated at C is arranged adjacent the transfer drum to receive light from a light emitting tube 40 mounted on the opposite side of transfer drum 28.

Transfer drum 28 in the machine is formed of a series of spaced wheels 45 in such a way that light can freely pass through the drum to photoelectric sensing device C.

Figure 6:
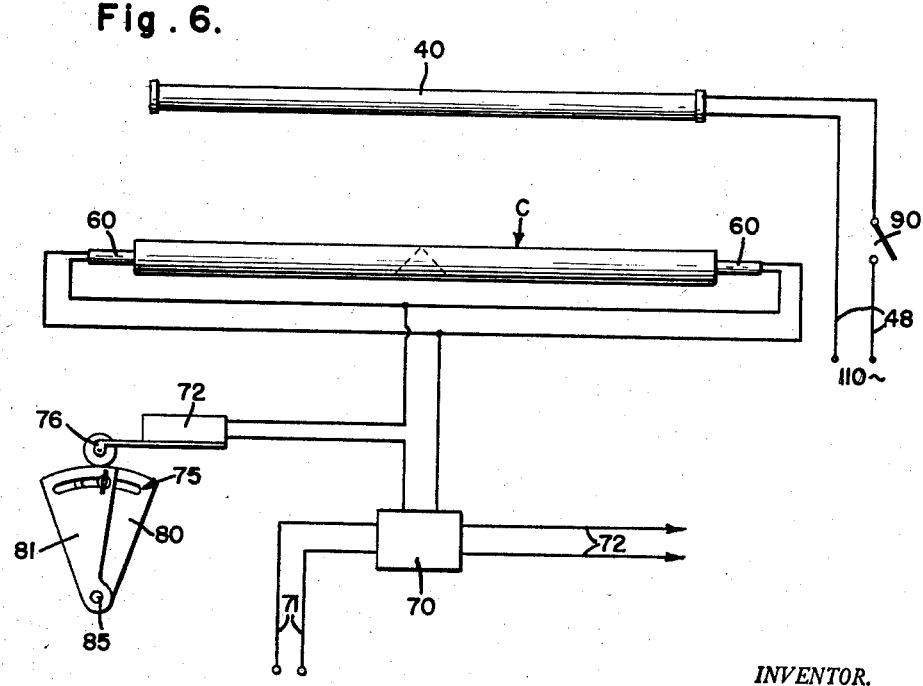
FIG. 6 is a schematic view showing the circuit connections for operation of the device of this invention.

Light emitting tube 40 comprises an ordinary fluorescent light tube which should be as long or longer than the drum itself. If desired a light shield can be mounted around the tube so that light is only directed toward photoelectric sensing device C. Such a tube can be operated from a regular 110 or 220 volt line as indicated in 48 in FIG. 6.

Photoelectric sensing device C is formed with a tubular housing 50 having a longitudinal slot forming a light receiving aperture 51. Aperture 51 runs just short of the entire length of photoelectric sensing device C and is preferably formed without having any light blocking obstructions throughout its entire length.

The interior of housing 50 is formed of a reflective material such as polished stainless steel. The interior of the tube may, of course, be coated with a highly reflective glass finish or any other coating which would provide the interior of the tube with a good light reflecting finish.

The interior of the center portion of housing 50 is provided with two mirrors 54 and 55 sloped at a 45° angle relative to the longitudinal axis of the tube and meeting at an apex aligned with aperture 51. Two photoelectric cells 60 are each mounted on opposite ends of housing 50 in ring mount 61. The photoelectric cells are directed to receive light along the central axis of the tube and from the various side walls forming the bore of the tube.

Ring mounts 61 are slidably mounted within the bore of the tube by means of two bolts 65 which extend outwardly through two elongated slots 66. Ring mounts 61 are thus held in place by wing nuts 68. For this reason the entire photoelectric cell structure can be moved inwardly toward the center of photoelectric sensing device C or outwardly to take advantage of light sensing throughout the entire length of the tube.

The two photoelectric cells 60 are connected in parallel to an amplifying and switching circuit 70. Amplifying and switching circuit 70 is connected by lines 71 to a source of power arranged through output line 72 to control printing mechanism A.

Photoelectric cells 60 are disconnected from actuating contact with amplifying and switching circuit 70 by a microswitch 72 which is cam actuated to be in the on position by a cam 75 via a cam follower 76 directly connected to the switch contact points of the microswitch.

Cam 75 is adjustable in its width by two fan like members 80 and 81 which may be extended or retracted to a minimum or maximum actuating period. Cam 75 is connected to a shaft 85 which rotates in geared time driven relationship with the various drums of the printing press and is timed to cause microswitch 72 to be in a closed position during the interval that a piece of paper is to be driven past the path of light from light emitting tube 40 to photoelectric sensing device C.

In operation light emitting tube 40 is actuated by turning on a switch 90 which will connect the source of power through lines 48 to the light.

The printing press is then put into operation and cam 75 is arranged so that the photoelectric sensing device C is actuated only during the time that paper should be passing between light source 40 and the photoelectric sensing device. Should a piece of paper tie up in the machine and not pass between the light source and the photoelectric sensing device during the proper time interval, the presence of light reaching the photoelectric cells will cause amplifying and switching circuit 70 to shut off the press through the control effected through line 72. The same effect will occur if a portion of the paper is torn so that light is transferred through a portion of the sheet of paper B.

The two photoelectric cell ring mounts 61 are positioned so that they extend inwardly to a point in alignment with the outer edges of the paper. In this way the effective scanning length of the tube is registered with the precise paper width. If paper should happen to be misregistered on the drum either to the right or the left, light will also pass to the photoelectric cells to cause a similar de-activation of the printing press. It is noted that because of the construction of photoelectric sensing device C that the entire scan distance between the two photoelectric cells is sensitive to the reception of light. Light entering any portion of aperture 51 will be reflected from wall to wall within housing 50 to cause the energization of one or the other of photoelectric sensing cells 60.

Mirrors 54 and 55 tend to assist in the direction of light transmission to the cells. It is also noted that because the mirrors 54 and 55 have their meeting apex at the aperture that there is no place along the tube where the presence of light will not be effective to actuate either of the two photoelectric cells.

While this device has been shown in particular application on a printing press it is believed that the device would be equally well applicable for sensing or controlling any piece of equipment in which a sheet material is drawn past a given station.

An important feature and advantage of the sensing device is that the device will be responsive to the receipt of light anywhere along the length of the tube so that misregistered, torn or missing objects can be detected and proper remedial switching circuits can be controlled thereby.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A light collecting device comprising a straight elongate tube having a light reflective internal bore, a reflecting mirror mounted internally within the tube, said mirror being angularly oriented relative the tube longitudinal axis, an optical transducer mounted on the tube to sense light within said tube and facing the mirror within the tube, and an elongated aperture for admitting light into said tube, said aperture being formed by the tube extending between the mirror and the optical transducer whereby the light delivered to the optical transducer is the summation of the total amount of light entering the tube through the aperture.

2. A light collecting device for collecting light along a predetermined line comprising a straight elongate tube, a slot extending longitudinally along said tube formed by the outer wall of the tube to form a light receiving elongated aperture, a pair of mirrors mounted in the middle of said tube, said mirrors being angularly oriented relative the tube longitudinal axis and facing toward opposite ends of the tube, the internal walls of said tube having a light reflecting surface, and optical transducers mounted on opposite ends of said tube and aligned to sense the presence of light along the center axis of said tube.

3. A light collecting device according to claim 2 and wherein said tube is provided with means for slidably moving said optical transducers to selected positions inwardly from the ends of said tube.

4. In a machine arranged to pass an object having a predetermined width past a fixed point at predetermined intervals the combination of an elongate light source means mounted on one side of the path of the object through the machine, said light source means having a length at least equal to the width of the object to be passed through the machine, a straight elongate light sensing tube mounted on the opposite side of the path of the object through the machine in position to receive light from said light source means, said tube being formed with an elongated slot facing said light source means, said slot having a length substantially equal to the width of objects to be passed through said machine, an optical transducer mounted at a longitudinal end of said tube to sense light in the interior of said tube, said tube formed with a reflective interior bore, a mirror surface mounted within said tube and facing said optical transducer, machine control means actuated by said optical transducer, and timing means connected to activate said machine control means during the intervals that objects are moved past a light obstructing position between said light source means and said light sensing tube.

References Cited in the file of this patent

UNITED STATES PATENTS

| | | |
|---|---|---|
| 2,389,891 | Budden et al. | Nov. 27, 1945 |
| 2,947,876 | Larew | Aug. 2, 1960 |
| 2,967,947 | Flook | Jan. 10, 1961 |

FOREIGN PATENTS

| | | |
|---|---|---|
| 1,063,326 | France | May 3, 1954 |